United States Patent
Lee

(10) Patent No.: US 7,726,147 B2
(45) Date of Patent: Jun. 1, 2010

(54) REFRIGERATOR CAPABLE OF PROMOTING PHOTOSYNTHESIS OF VEGETABLES AND CONTROL METHOD THEREFOR

(75) Inventor: Kee Chul Lee, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 573 days.

(21) Appl. No.: 11/715,901

(22) Filed: Mar. 9, 2007

(65) Prior Publication Data
US 2008/0006049 A1 Jan. 10, 2008

(30) Foreign Application Priority Data
Jul. 3, 2006 (KR) .................. 10-2006-0062129

(51) Int. Cl.
*F25D 23/00* (2006.01)
(52) U.S. Cl. .................................. 62/264; 426/248
(58) Field of Classification Search .................. 62/348, 62/264; 426/248
See application file for complete search history.

(56) References Cited

U.S. PATENT DOCUMENTS

| | | | | |
|---|---|---|---|---|
| 3,578,464 A | * | 5/1971 | Mpelkas | .................. 426/248 |
| 6,725,598 B2 | | 4/2004 | Yoneda et al. | |
| 2005/0258961 A1 | * | 11/2005 | Kimball et al. | .......... 340/572.1 |
| 2006/0042300 A1 | * | 3/2006 | Kim | ........................ 62/348 |
| 2007/0151149 A1 | * | 7/2007 | Karpinski | .............. 47/58.1 LS |

FOREIGN PATENT DOCUMENTS

| | | |
|---|---|---|
| DE | 102 30 133 | 2/2003 |
| DE | 10 2005 022 934 | 3/2006 |
| EP | 1 574 126 | 9/2005 |
| EP | 1 630 500 | 3/2006 |
| JP | 10-201368 | 8/1998 |
| JP | 2006-017443 | 1/2006 |
| WO | 98/47346 | 10/1998 |

* cited by examiner

*Primary Examiner*—Sam Chuan C Yao
*Assistant Examiner*—Jonathan Bradford
(74) *Attorney, Agent, or Firm*—Bacon & Thomas, PLLC

(57) ABSTRACT

A refrigerator includes a storing unit for storing vegetables; a light emitting unit for irradiating light onto the vegetables stored in the storing unit to promote photosynthesis of the vegetables; an input unit for receiving an operation instruction on whether the light emitting unit is to be turned on or off; a timer for detecting a current time to output current time information; and a control unit for controlling the light emitting unit in response to the operation instruction. If the operation instruction requests that the light emitting unit be off, the control unit controls the light emitting unit to be off; and if otherwise, the control unit controls the light emitting unit to be on or off depending on the current time information.

12 Claims, 3 Drawing Sheets

REFRIGERATOR CAPABLE OF PROMOTING PHOTOSYNTHESIS OF VEGETABLES AND CONTROL METHOD THEREFOR

FIELD OF THE INVENTION

The present invention relates to a refrigerator capable of promoting photosynthesis of vegetables; and, more particularly, to a refrigerator capable of promoting photosynthesis of vegetables by emitting light onto vegetables stored therein in such as manner that the vegetables can be kept in an environment similar to the natural environment, thereby maintaining the freshness thereof.

BACKGROUND OF THE INVENTION

In general, the refrigerator includes a compressor, a condenser, an expansion valve and an evaporator to perform a cooling cycle, and thus keeps the freshness of food items for a long period of time by cold air generated through such a cooling cycle.

In such a refrigerator, a freezer compartment for preserving food items in a frozen state and a refrigerator compartment for preserving the food items in a refrigerated state are partitioned inside a main body forming external appearance thereof, so that the food items can be stored in either the refrigerator compartment or the freezer compartment according to the storage temperature of the food items.

FIG. 1 shows a configuration of a conventional refrigerator 10 whose refrigerator compartment is provided with a plurality of shelves 11 and a vegetable room 12 to separately store a large amount of food items such as vegetables or fruits therein.

Such a refrigerator keeps the vegetables stored therein at a low temperature by simply controlling the cold air, whereby the freshness of the vegetables can be maintained for a certain period of time. However, in case of preserving them for a long time, the freshness of the vegetables may not be maintained.

The vegetables, which belong to the plant kingdom, respire and transpire even while they are stored in a refrigerator. Therefore, in order to maintain the freshness of the vegetables stored in the refrigerator, it is necessary to suppress the respiration and the transpiration.

Accordingly, the conventional refrigerator can maintain a certain degree of freshness by keeping the vegetables at a low temperature to suppress the respiration and in a high humidity to prevent the transpiration. However, since the chlorophyll contained in the vegetables cannot be prevented from being decomposed, the freshness of the vegetables cannot be maintained due to a decrease in the concentration of chlorophyll contained in the vegetables with the lapse of a certain period of time.

SUMMARY OF THE INVENTION

In order to solve the above-mentioned problem, it is, therefore, an object of the present invention to provide a refrigerator capable of promoting photosynthesis of vegetables to maintain the freshness of the vegetables stored therein by installing a photosynthesis promotion unit in the refrigerator and controlling the photosynthesis promotion unit in such a manner that the photosynthesis occurs in the vegetables stored in the refrigerator under conditions similar to those of the natural environment.

In accordance with one aspect of the present invention, there is provided a refrigerator including a storing unit for storing vegetables; a light emitting unit for irradiating light onto the vegetables stored in the storing unit to promote photosynthesis of the vegetables; an input unit for receiving an operation instruction on whether the light emitting unit is to be turned on or off; a timer for detecting a current time to output current time information; and a control unit for controlling the light emitting unit in response to the operation instruction, wherein, if the operation instruction requests that the light emitting unit be off, the control unit controls the light emitting unit to be off; and if otherwise, the control unit controls the light emitting unit to be on or off depending on the current time information.

In accordance with another aspect of the present invention, there is provided a control method of a refrigerator including a storing unit for storing vegetables and a light emitting unit for emitting light onto the vegetables stored in the storing unit to promote photosynthesis of the vegetables, the method comprising the steps of: a first step of receiving an operation instruction on whether the light emitting unit is to be on or off; a second step of controlling the light emitting unit to be off if the operation instruction requests that the light emitting unit be off, and receiving current time information from a timer if the operation instruction requests that the light emitting unit be on; and a third step of controlling the light emitting unit to be on or off based on the current time information if the operation instruction requests that the light emitting unit be on.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
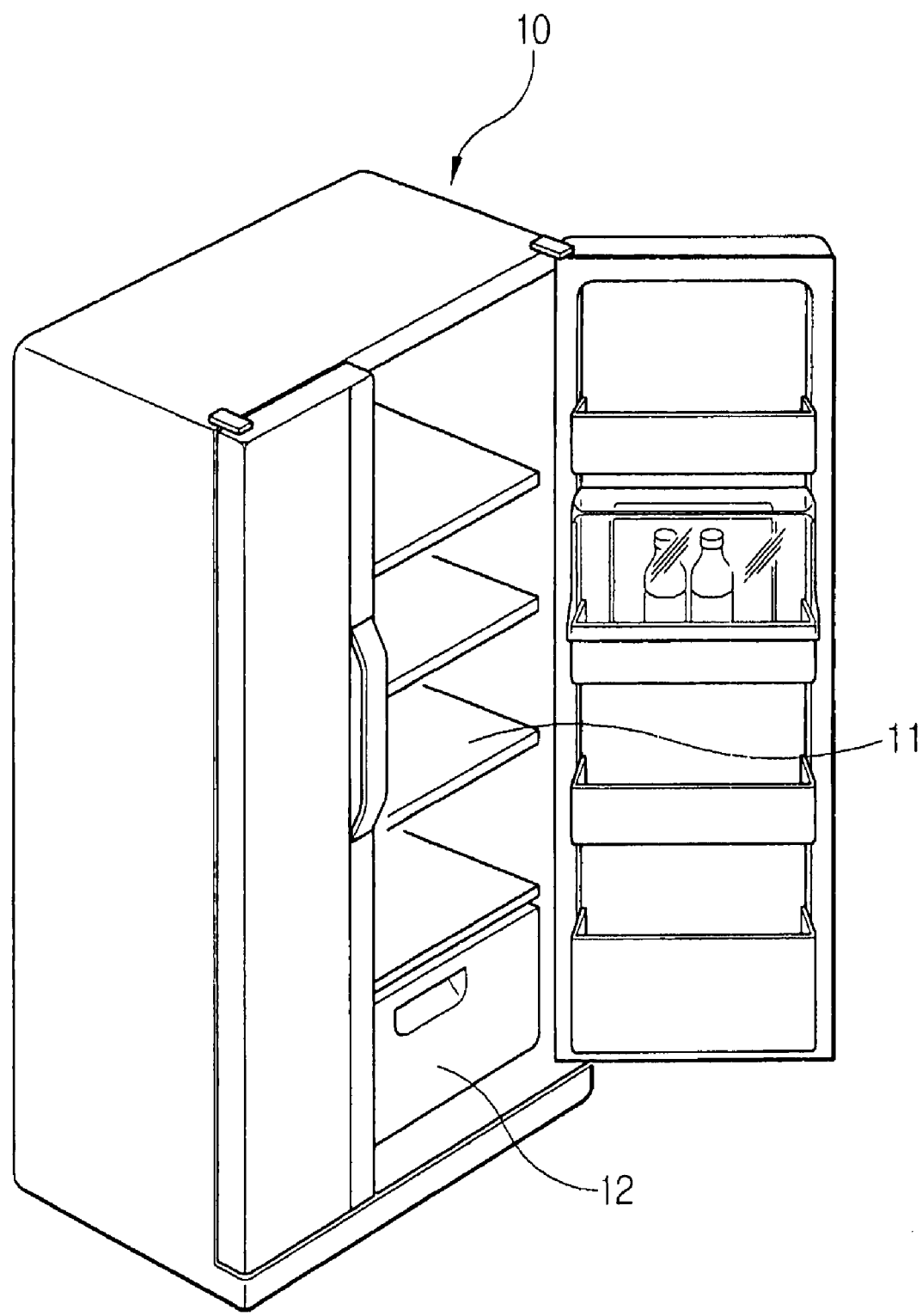
FIG. 1 is a perspective view for showing a conventional refrigerator.
Figure 2:
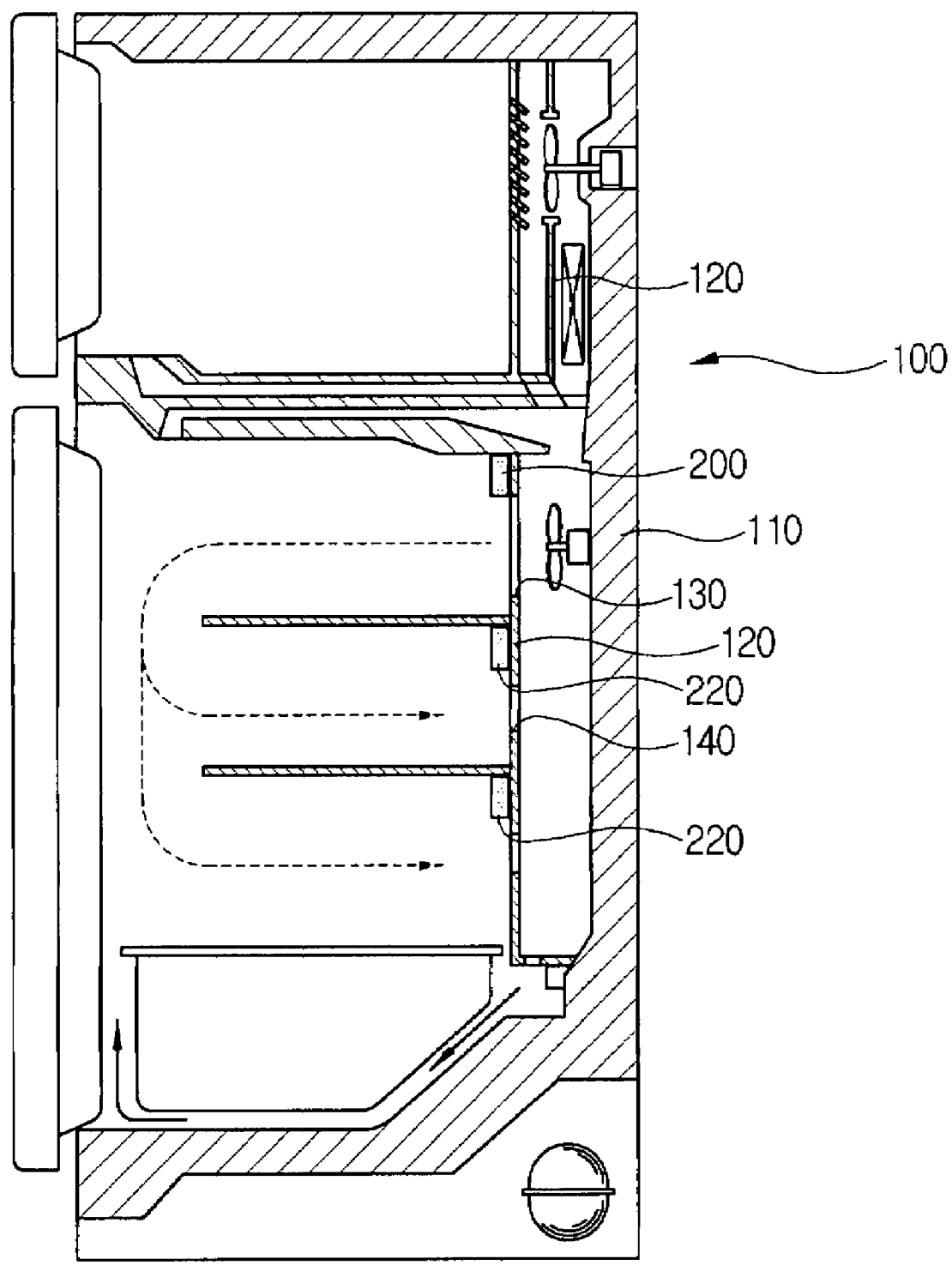
FIG. 2 is a cross sectional view for illustrating a configuration of a refrigerator capable of promoting photosynthesis of vegetables in accordance with the present invention.
Figure 3:
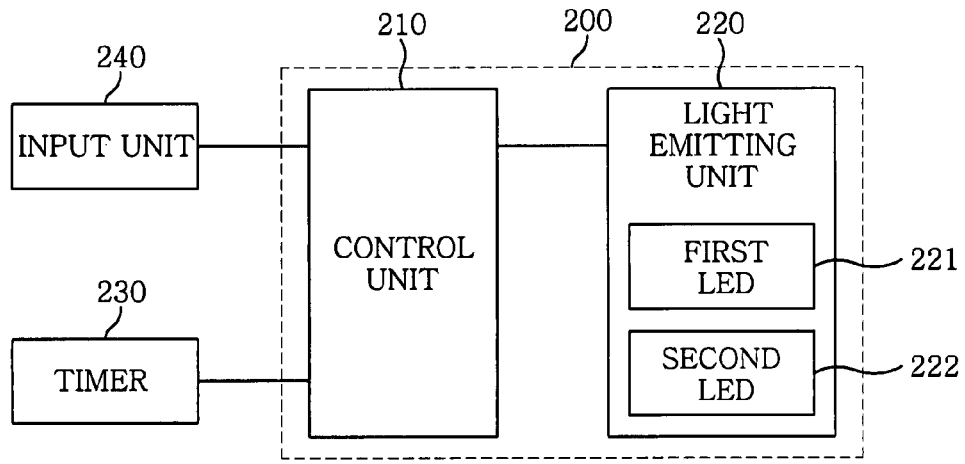
FIG. 3 is a block diagram for showing a configuration for controlling the photosynthesis of the vegetables stored in the refrigerator in accordance with the present invention.

FIG. 2 is a cross sectional view for illustrating a configuration of a refrigerator capable of promoting photosynthesis of vegetables in accordance with the present invention; and FIG. 3 is a block diagram for showing a configuration for controlling the photosynthesis of the vegetables stored in the refrigerator in accordance with the present invention.

As shown therein, a refrigerator 100 in accordance with the present invention includes a main body 110 divided into a freezer compartment at an upper portion thereof and a refrigerator compartment at a lower portion thereof; one or more photosynthesis promotion units 200, installed in the refrigerator compartment, for emitting light required for photosynthesis of vegetables; a timer 230 for providing time information to the photosynthesis promotion units 200 so that the photosynthesis promotion units 200 can operate according to a current time; and an input unit 240.

In the main body 110, a louver 120 is installed to form a duct for supplying air cooled in a cooling unit into the freezing and refrigerator compartments. In particular, the photosynthesis promotion units 200 are fixed to a front side of the louver 120 installed in the refrigerator compartment.

The louver 120 has at least one discharge opening 130 for discharging air cooled in the cooling unit to an inside of the refrigerator compartment, and at least one suction opening 140 for sucking the air which has exchanged heat with stuff stored in the refrigerator compartment.

The cold air supplied through the louver 120 keeps the vegetables stored in the refrigerator compartment at a low temperature, thereby suppressing respiration thereof.

The photosynthesis promotion units 200 are installed in an inner side surface or a backside surface of the main body 110 in such a manner that light can be emitted from the photosynthesis promotion units 200 to the vegetables stored in the refrigerator compartment. Here, the light is turned on or off depending on time; or the light intensity is adjusted such that the vegetables stored in the refrigerator compartment can perform photosynthesis under conditions similar to the natural environment.

To be more specific, each photosynthesis promotion unit 200 includes a control unit 210 for controlling the operation of the photosynthesis promotion units 200; and a light emitting unit 220 for emitting light.

The control unit 210 outputs signals for turning on and off the light emitting unit 220 and for adjusting the light intensity (brightness) of the light emitted from the light emitting unit 220.

To be more specific, the control unit 210 compares a current time detected by the timer 230 to a reference time to determine whether the light emitting unit 220 should be turned on or off. If the detected current time is within daytime zone (for example, 7 a.m. to 7 p.m.), the control unit 210 outputs an ON signal to the light emitting unit 220. On the contrary, the control unit 210 outputs an OFF signal to the light emitting unit 220 if the detected current time is within nighttime zone (for example, 7 p.m. to 7 a.m.).

Further, the control unit 210 may divide the daytime hours into a plurality of time zones. For example, the daytime zone may be divided into a first time zone (for example, 7 a.m. to 11 a.m.), a second time zone (for example, 11 a.m. to 3 p.m.) and a third time zone (for example, 3 p.m. to 7 p.m.), and the control unit 210 may adjust the light intensity of the light emitted by emitting unit 220 according to the time zones.

It is preferable that the control unit 210 is included in a refrigerator controller for controlling main operations of the refrigerator.

The light emitting unit 220, configured with, e.g., a plurality of LEDs for emitting light having different wavelengths, is turned on and off in response to the control signal outputted from the control unit 210. Further, as described above, the light intensity of the light emitted from the light emitting unit 220 may be adjusted by the control unit 210.

More specifically, the light emitting unit 220 is configured with a first LED 221 and a second LED 222. The wavelength of light emitted from the second LED 222 is different from that of first LED 221, and the second LED 222 is disposed to be, e.g., adjacent to the first LED 221. Preferably, the first LED 221 emits light whose wavelength is within a range from 600 to 650 nm, whereas the second LED 222 emits light whose wavelength is within a range from 450 to 500 nm. With this configuration, light of an appropriate wavelength can be supplied to the vegetables according to current states thereof (e.g., whether the vegetables are in a growth stage or a mature stage).

As described above, the vegetables stored in the refrigerator compartment can be supplied with light of an appropriate wavelength and an appropriate light intensity according to the time and the current states of the vegetables. Thus, biological or chemical processes that cause to deteriorate the freshness of vegetables can be suppressed. To be specific, the decomposition of chlorophyll contained in leaves of vegetables is suppressed. Thus, the decrease in the chlorophyll concentration is also suppressed to keep vegetables green in color. Further, the decrease in the amount of vitamin C contained in vegetables is also suppressed. Thus, vegetables can be kept fresh for a longer period of time, while maintaining the nutrients therein to be intact.

Meanwhile, although the photosynthesis promotion units 200 are preferably installed at an uppermost portion of the louver 120 so that light is irradiated downward from the upper portion of the refrigerator compartment, it is also possible to install some of the light emitting units 220 underneath the shelves that partitions the inside of the refrigerator compartment as shown in FIG. 2.

The timer 230, which is a clock for example, serves to detect the current time to generate current time information for determining the turn-on or turn-off of the light emitting unit 220, and the appropriate light intensity of the light emitted therefrom to be adjusted. Then, the current time information is inputted to the photosynthesis promotion units 200.

The input unit 240 serves to receive operation instructions from a user of the refrigerator. The operation instructions include temperature selections of the freezer compartment and the refrigerator compartment; a selection of high-speed or normal refrigerating mode; and a selection of the turn-on or turn-off of the photosynthesis promotion units 200. If one or more of the operation instructions of the photosynthesis promotion units 200 are inputted, the input unit 240 transfers the operation instructions to the control unit 210 as electrical signals. For example, if the operation instructions inputted from the input unit 240 request that the photosynthesis promotion units be turned on, the input unit 240 transmits a signal corresponding to this request to the control unit 210.

Figure 4:
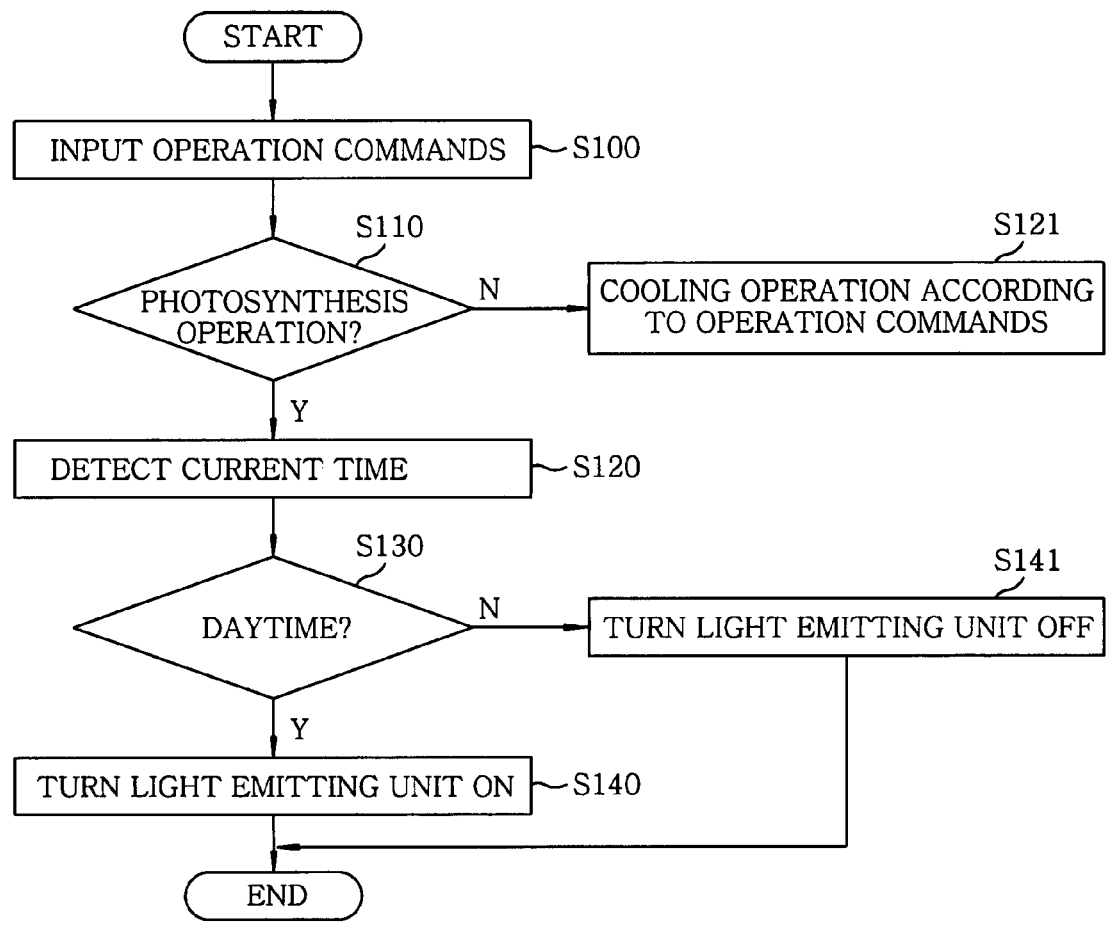
FIG. 4 is a flow chart for describing a process for controlling the photosynthesis of the vegetables stored in the refrigerator in accordance with the present invention.

Next, the operation of the refrigerator capable of performing the photosynthesis of vegetables will be described with reference to FIGS. 3 and 4.

When the refrigerator starts the operation, the operation instructions, which including temperature selections of the freezer compartment and the refrigerator compartment, a selection of high-speed or normal refrigerating mode and a selection of the turn-on or turn-off of the photosynthesis promotion units 200, are inputted to the input unit 240 in step S100.

In step S110, it is checked whether the operation instructions, inputted in step 100, request that the photosynthesis promotion units 200 be turned on or off. Then, if the operation instructions request that the photosynthesis promotion units 200 be turned on, the process is proceeded to step S121. In step S121, the control unit 210 controls the refrigerator to perform a cooling cycle is performed according to the operation instructions inputted from the input unit 240, such that the temperatures of the freezer compartment and the refrigerator compartment are adjusted to the selected temperatures, and the refrigerating more is set to be the high-speed or normal refrigerating pursuant to the selection included in the operation instructions.

On the other hand, if the operation instructions inputted in step 100 request that the photosynthesis promotion units 200 be turned on, the process is proceeded to step S120. In step S120, the control unit 210 transmits a time request signal that requests the current time information to the timer 230. In response thereto, the timer 230 detects the current time and transmits the current time information to the control unit 210.

Further, it is preferable that information about the current states of the vegetables is also inputted to the input unit 240 in step S110, and, in response thereto, the control unit 210 selects the wavelength of the light in step S120. For example, if the vegetables are in a mature stage, a wavelength of 600 to 650 nm is selected. On the contrary, for example, if the vegetables are in a growth stage, a wavelength of 450 nm to 500 nm, which is required for early growths of vegetables, is selected. Accordingly, the vegetables can be supplied with light having an appropriate wavelength according to the current states of the vegetables.

Next, in step S130, if the current time is determined to be in the daytime zone based on the current time information provided from the timer 230, the control unit 210 performs step S141 to transmit a turn-on signal to turn on the photosynthesis promotion unit(s) 220 whose wavelength of light corresponds to the wavelength selected in step S120. However, if the current time is determined in step S130 to be in the nighttime zone, the control unit 210 performs step S141 to transmit a turn-off signal to turn off all of the photosynthesis promotion units 220.

More specifically, in step S140, the control unit 210 compares the current time detected by the timer 230 to the reference time to determine whether the light emitting units 220 are to be turned on or off. If the detected current time is within daytime zone (for example, 7 a.m. to 7 p.m.), the control unit 210 outputs a turn-on signal to the light emitting units 220, whereas it outputs a turn-off signal of the light emitting unit 220 if the detected current time is within nighttime zone (for example, 7 p.m. to 7 a.m.).

Preferably, in step S140, the control unit 210 outputs not only the turn-on and turn-off signals but also an intensity control signal for adjusting the light intensity of the light emitting unit 220. To be specific, the control unit 210 divides the daytime zone into a plurality of time zones such as the following: the first time zone (for example, 7 a.m. to 11 a.m.), the second time zone (for example, 11 a.m. to 3 p.m.) and the third time zone (for example, 3 p.m. to 7 p.m.). Then, if the turn-on signal is to be transmitted to the light emitting units 220, and if the detected current time is within a specified time zone (the first time zone, for example), the control unit 210 adjusts the light intensity of the light emitting units 220 to a preset level corresponding to that time zone (the first time zone, for example).

Herein, similarly to the natural environment, the preset level of light intensity is set to be higher around midday than the morning and afternoon hours. In this manner, the light conditions for the vegetables in the refrigerator compartment can be set to be similar to those in the natural environment, so that the vegetables can be kept fresh in the refrigerator.

As described above, in accordance with the present invention, light required for photosynthesis of vegetables can be supplied sufficiently into the refrigerator, and the light conditions for the vegetables in the refrigerator can be set to be similar to those in the natural environment.

Thus, since decomposition of chlorophyll of the vegetables can be suppressed, it is possible to maintain the freshness of the vegetables stored in the vegetable room of the refrigerator.

While the invention has been shown and described with respect to the embodiments, it will be understood by those skilled in the art that various changes and modifications may be made without departing from the scope of the invention as defined in the following claims.

What is claimed is:

1. A refrigerator comprising:
    a storing unit for storing vegetables;
    a light emitting unit for irradiating light onto the vegetables stored in the storing unit to promote photosynthesis of the vegetables;
    an input unit for receiving an operation instruction on whether the light emitting unit is to be turned on or off;
    a timer for detecting a current time to output current time information; and
    a control unit for controlling the light emitting unit in response to the operation instruction,
    wherein, if the operation instruction requests that the light emitting unit be off, the control unit controls the light emitting unit to be off; and if otherwise, the control unit controls the light emitting unit to be on or off depending on the current time information, and
    wherein the input unit further receives a current state of the vegetables indicating whether the vegetables are in mature stage or in growth stage, and the control unit adjusts a wavelength of the light emitted from the light emitting unit based on the current state.

2. The refrigerator of claim 1, wherein the control unit detects a current time from the current time information, and
    wherein, if the detected current time is within a daytime zone, the control unit controls the light emitting unit to be on; and if otherwise, the control unit controls the light emitting unit to be off.

3. The refrigerator of claim 2, wherein the control unit classifies the daytime zone into a plurality of time zones, and
    wherein, if the detected current time is within the daytime zone, the control unit adjusts a light intensity of the light emitting unit according to a time zone to which the detected current time belongs, the time zone being one of the plurality of time zones.

4. The refrigerator of claim 1, wherein the light emitting unit includes at least one first LED and at least one second LED, the second LED emitting light whose wavelength is different from that of the first LED, and
    wherein the control unit adjusts the wavelength of the light emitted from the light emitting unit by controlling the first and the second LED to be on and off according to the current state inputted from the input unit.

5. The refrigerator of claim 4, wherein the light emitted from the first LED has a wavelength that falls within a range from 600 nm to 650 nm when the current state is that the vegetables are in mature stage.

6. The refrigerator of claim 4, wherein the light emitted from the second LED has a wavelength that falls within a range from 450 nm to 500 nm when the current state is that the vegetables are in growth stage.

7. A control method of a refrigerator including a storing unit for storing vegetables and a light emitting unit for emitting light onto the vegetables stored in the storing unit to promote photosynthesis of the vegetables, the method comprising the steps of:
    a first step of receiving an operation instruction on whether the light emitting unit is to be on or off;
    a second step of controlling the light emitting unit to be off if the operation instruction requests that the light emitting unit be off, and receiving current time information from a timer if the operation instruction requests that the light emitting unit be on;

a third step of controlling the light emitting unit to be on or off based on the current time information if the operation instruction requests that the light emitting unit be on, and wherein, in the first step, the input unit further receives a current state of the vegetables indicating whether the vegetables are in mature stage or in growth stage; and, in the third step, a wavelength of the light emitted from the light emitting unit is adjusted according to the current state.

8. The control method of claim 7, wherein, in the third step, a current time is detected from the current time information, and wherein, if the detected current time is within a daytime zone, the light emitting unit is controlled to be on; and if otherwise, the light emitting unit is controlled to be off.

9. The control method of claim 8, wherein, in the third step, the daytime zone is classified into a plurality of time zones, and wherein, if the detected current time is within the daytime zone, a light intensity of the light emitting unit is adjusted according to a time zone to which the detected current time belongs, the time zone being one of the plurality of the time zones.

10. The control method of claim 7, wherein the light emitting unit includes at least one first LED and at least one second LED, the second LED emitting light whose wavelength is different from that of the first LED, and wherein the wavelength of the light emitted from the light emitting unit is adjusted by controlling the first and the second LED to be on and off according to the current state inputted from the input unit.

11. The control method of claim 10, wherein the light emitted from the first LED has a wavelength that falls within a range from 600 nm to 650 nm when the current state is that the vegetables are in mature stage.

12. The control method of claim 10, wherein the light emitted from the second LED has a wavelength that falls within a range from 450 nm to 500 nm when the current state is that the vegetables are in growth stage.

* * * * *